Feb. 12, 1929.　1,701,689
J. S. MINTON
ROAD DRAG
Filed Dec. 2, 1927　2 Sheets-Sheet 2
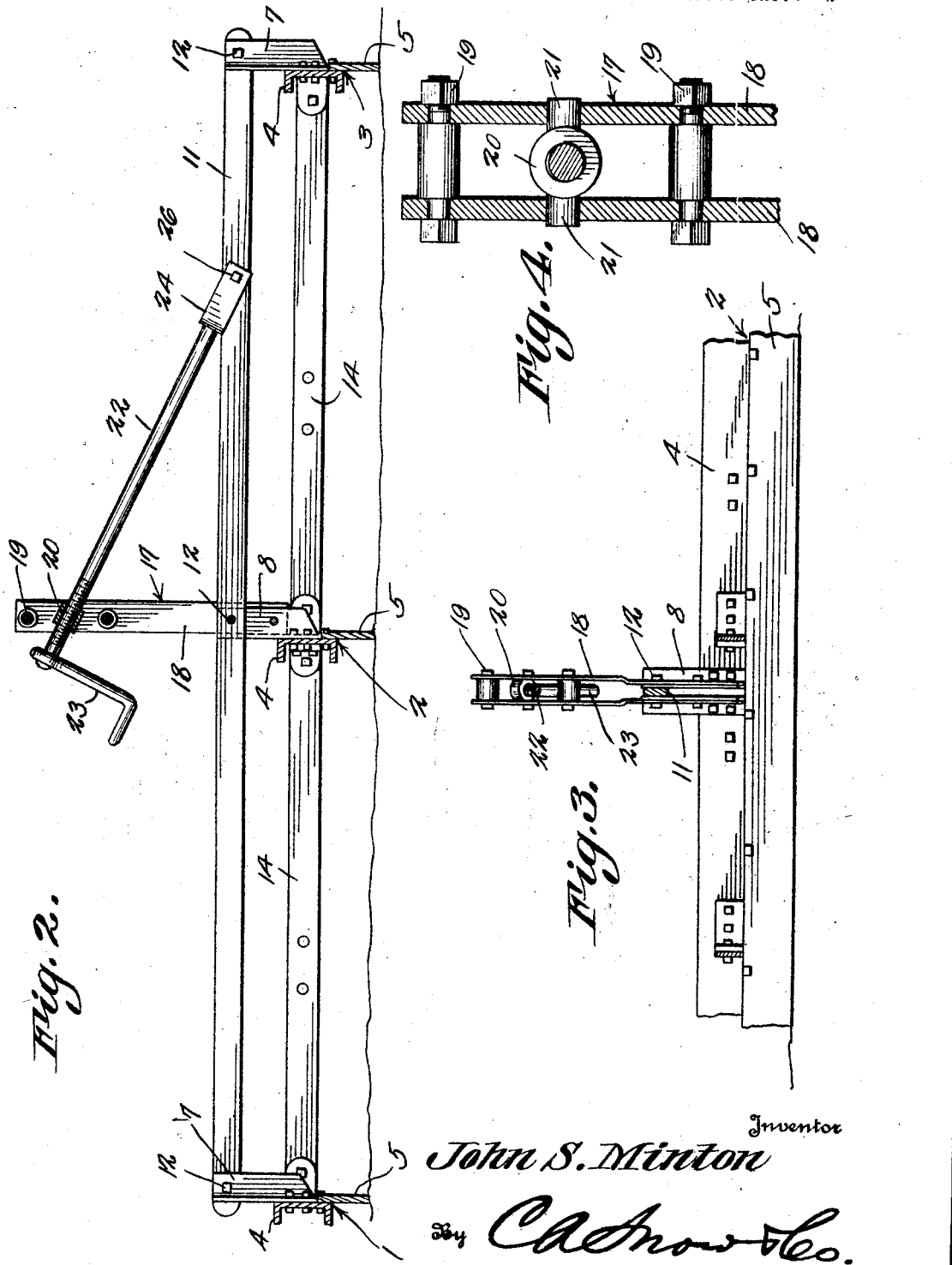
Inventor
John S. Minton
By C.A.Snow&Co.
Attorneys Patented Feb. 12, 1929.

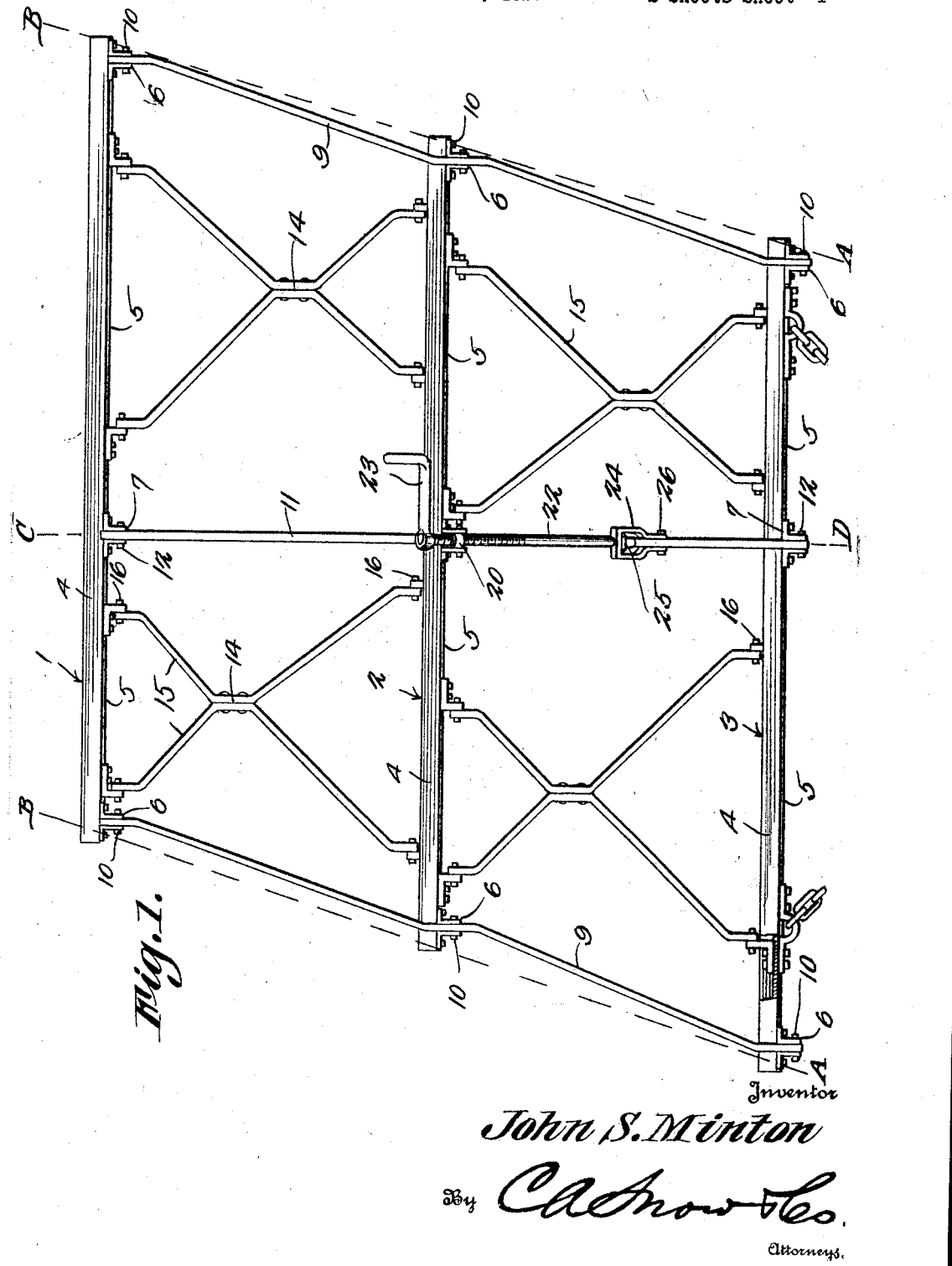

1,701,689

UNITED STATES PATENT OFFICE.

JOHN S. MINTON, OF GREELEY, COLORADO.

ROAD DRAG.

Application filed December 2, 1927. Serial No. 237,255.

The device forming the subject matter of this application is a road drag. It is desirable that the transverse drag bars have their ends set at different distances with respect to a central plane parallel or coinciding with the draft line, and this invention aims to provide a system of bracing for the drag bars, arranged as above described, the strength of the machine being promoted. Another object of the invention is to provide novel means for altering the pitch or tilt of the drag bars with respect to the surface of the roadway.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in top plan, a device constructed in accordance with the invention, parts being in section;

Figure 2 is a section in a plane parallel to the draft line, parts remaining in elevation;

Figure 3 is a fragmental cross section showing the mounting of the adjusting screw; and Figure 4 is a sectional view showing part of one of the posts and the mounting of the nut into which the adjusting screw is threaded.

The machine includes a rear drag member 1, an intermediate drag member 2, and a front drag member 3, each made up of a channel bar 4 to which a depending blade 5 is secured. The ends of the drag members 1, 2 and 3 are arranged in approximately parallel lines A—B that are acutely disposed with respect to the draft line C—D. Upstanding first posts 6 are secured to the ends of the drag members 1, 2 and 3, and upstanding second posts 7 are secured to the drag members 1 and 3, an upstanding second post 8 is secured to the intermediate drag member 2. The second post 8 of the intermediate drag member 2 is located midway between the ends of the intermediate drag member 2, and the second posts 7 of the front drag member 3 and the rear drag member 1 are so located on the said drag members as to define a long part and a short part in the drag members 1 and 3, as clearly shown in Figure 1 of the drawings. In that figure, it appears, moreover, that the long parts of the drag members 1 and 3 are located at diagonally opposite corners of the machine, the short parts of the drag members 1 and 3 being located at the other two diagonally opposite corners of the machine.

Outer tie bars 9 are pivoted at 10 to the first posts 6 and follow approximately the aforesaid acutely disposed lines A—B. An intermedate tie bar 11 is disposed at right angles to the drag members 1, 2 and 3 and is pivoted at 12 to the second posts 7 and 8. X-shaped braces are provided, and include arms 15 pivoted at 16 to the intermediate drag member 2 to the rear drag member 1, and to the front drag member 3. The arms of each brace 14 that are pivoted to the short parts of the front drag member 3 and of the rear drag member 1 are spaced apart less widely than are the arms of each brace that are pivoted to the long parts of the front and rear drag members. Owing to this construction of the X-shaped braces 14 and to the specific arrangement of the braces with respect to the tie bars 11 and 9, a stronger and more satisfactory structure results than has been disclosed heretofore, and the drag members 1, 2 and 3 will remain in the longitudinally off-set relations shown in Figure 1 of the drawings.

A means is provided for holding the drag members 1, 2 and 3 at an adjusted pitch with respect to the surface which is being dragged. The aforesaid means includes an extension 17 secured to the intermediate upstanding post 8, and forming part thereof, the extension 17 being made up of a pair of parallel bars 18 that are held rigidly at a fixed distance apart by connecting bolts 19 or the like. A nut 20 is located between the bars 17 and has trunnions 21 mounted to turn in the bars 18, so that the nut 20 may be said to be pivotally mounted on the second post 8—17. An inclined screw 22 is threaded into the nut 20 and is provided at its rear end with a handle 23 for the ready turning of the screw at the hand of an operator. The lower forward end of the screw 22 has a swiveled connection with the intermediate tie bar 11. The swiveled connection may be brought about by journaling the screw 22 in a yoke 24, the screw having a head 25 that bears against the inner side of the end of the yoke 24, the yoke being pivoted at 26 to the intermediate tie bar 11. It is clear that by threading the screw 22 lengthwise through the nut 20, the tie bar 11 will be moved longitudinally, thereby tilting the posts 7 and 8 and changing the inclination of the blades 5 with respect to the surface of the roadway.

What is claimed is:—

1. A machine of the class described, comprising rear, intermediate and front drag members having their ends arranged in approximately parallel lines that are acutely disposed with respect to the draft line, upstanding first posts secured to the ends of the drag members, upstanding second posts secured to the drag members, the second post of the intermediate drag member being located midway between the ends of the intermediate drag member, and the second posts of the front and rear drag members being so located on the front and rear drag members as to define a long part and a short part in the front and rear drag members, the long parts of the front and rear drag members being located at diagonally opposite corners of the machine, outer tie bars pivoted to the first posts and following approximately said acutely disposed lines, an intermediate tie bar disposed at right angles to the drag members and pivoted to the second posts, X-shaped braces comprising arms pivoted to the intermediate and to the front and rear drag members, the arms of each brace that are pivoted to the short parts of the front and rear drag members being spaced apart less widely than are the arms of each brace that are pivoted to the long parts of the front and rear drag members, and means for holding the drag members at an adjusted pitch with the surface which is being dragged.

2. A machine of the class described, comprising rear, intermediate and front drag members having their ends arranged in approximately parallel lines that are acutely disposed with respect to the draft line, upstanding first posts secured to the ends of the drag members, upstanding second posts secured to the drag members, the second post of the intermediate drag member being located midway between the ends of the second drag member, and the second posts of the front and rear drag members being so located on the front and rear drag members as to define a long part and a short part in the front and rear drag members, the long parts of the front and rear drag members being located at diagonally opposite corners of the machine, outer tie bars pivoted to the first posts and following approximately said acutely disposed lines, an intermediate tie bar disposed at right angles to the drag members and pivoted to the second posts, X-shaped braces pivoted at their inner ends to the intermediate member and at their outer ends to the front and rear members, a nut pivotally mounted in the second post of the intermediate drag member, and a screw threaded into the nut and having swivel connection with the intermediate tie bar.

In testimony that I claim the foregoing as my own, I have hereto affixed my signature.

JOHN S. MINTON.